United States Patent [19]

Bower

[11] 4,015,627
[45] Apr. 5, 1977

[54] PRESSURE RELIEF VALVE

[75] Inventor: Allen M. Bower, Painsville, Ohio

[73] Assignee: Emco Wheaton Inc., Conneaut, Ohio

[22] Filed: May 9, 1975

[21] Appl. No.: 575,871

[52] U.S. Cl. .............................. 137/494; 137/467; 137/624.27

[51] Int. Cl.² ........................................ F16K 31/126

[58] Field of Search .......... 137/494, 461, 463, 467, 137/484.4, 484.8, 551, 554, 557, 556, 624.27; 230/10; 98/1.5; 251/338

[56] References Cited

UNITED STATES PATENTS

| | | | |
|---|---|---|---|
| 2,297,003 | 9/1942 | Larson | 251/338 X |
| 2,940,468 | 6/1960 | Drabik et al. | 137/461 |
| 3,029,836 | 4/1962 | Gruner | 137/557 |
| 3,040,772 | 6/1962 | Todd | 137/624.27 UX |
| 3,409,037 | 11/1968 | Nelson | 137/467 X |
| 3,411,533 | 11/1968 | Puster | 137/557 |
| 3,572,378 | 3/1971 | Hartwick et al. | 137/624.27 X |
| 3,703,191 | 11/1972 | Ekstrom | 137/494 |
| 3,800,736 | 4/1974 | Krohn | 137/624.27 X |

Primary Examiner—Robert G. Nilson
Attorney, Agent, or Firm—Fetherstonhaugh & Co.

[57] ABSTRACT

A pressure relief valve which will move to a fully open position as soon as a predetermined pressure is established within a vessel in which the valve is mounted. The valve comprises a housing mountable in the vessel with its inner end opening inwardly of the vessel and its outer end opening outwardly of the vessel. A pressure relief passage opens through the housing and a valve member is slidably mounted with respect to the housing for movement between a first position closing the pressure relief passage and a second position in which the pressure relief passage is open to permit full flow through the pressure relief passage. Locking means is provided for releasably interlocking the valve member and the housing to retain the valve member in its first position. Pressure responsive lock release means is mounted on the valve and movable in response to an increase in pressure above a predetermined minimum pressure to release the lock means to free the valve member and thereby permit the valve member to move to the full flow first position without requiring any increase in pressure in the vessel above the predetermined pressure.

2 Claims, 4 Drawing Figures

PRESSURE RELIEF VALVE

FIELD OF INVENTION

This invention relates to a pressure relief valve. In particular, this invention relates to the pressure relief valve which is adapted to move to a fully open position when a predetermined pressure is reached within a vessel in which the valve is mounted.

PRIOR ART

Pressure relief valves normally include a valve member which is movable with respect to the housing in which it is mounted in response to compression of a spring member located between the valve member and the housing. In this type of pressure relief valve, the compression of the spring controls the movement of the valve member to the open position. A greater pressure is, therefore, required to maintain the valve in the fully open position than is required to obtain initial opening of the valve. It follows that if a valve of this structure is designed to achieve an initial opening at a predetermined pressure, a pressure in excess of the predetermined pressure will be required in order to locate the valve in the fully open position. A relief valve of this type is not suitable for use in many installations wherein it is important to provide a relief valve which will be located in a fully open position when the predetermined pressure in a vessel is reached.

SUMMARY OF INVENTION

The present invention overcomes the difficulties of the prior art described above and provides a pressure relief valve which will move to a fully open position as soon as a predetermined pressure is established within a vessel in which the valve is mounted.

According to one aspect of the present invention, there is provided a pressure relief valve which comprises a housing mountable in a vessel and having an inner end opening inwardly of the vessel and an outer end opening outwardly of the vessel, a pressure relief passage opening through the housing, a valve member slidably mounted with respect to the housing for movement between a first position closing the pressure relief passage and a second position in which the passage is open to permit full flow through the pressure relief passage, lock means for releasably interlocking the valve member and the housing to retain the valve member in its first position, pressure responsive lock release means mounted on said valve and movable in response to an increase in pressure above a predetermined minimum pressure to release said lock means to free the valve member and thereby permit the valve member to move to the full flow first position without requiring any increase in pressure in the vessel above the predetermined pressure.

According to a further aspect of the invention, there is provided a pressure relief valve as described above wherein the housing has a stem passage opening therethrough, the stem passage having a radially outwardly extending recess formed therein, the valve member including a valve stem slidably mounted in the stem passage, a central passage extending longitudinally of the stem, a locking passage extending radially through the valve stem, the lock means being mounted for movement in said locking passage between a locking position projecting from the stem into the recess of the housing to interlock the valve member with respect to the housing when the valve member is in the first position and a release position in which it is inwardly withdrawn from the recess to release the valve member with respect to the housing, lock release passage means extending longitudinally through the stem member communicating with the locking passage means, the pressure responsive lock release means including a lock release shaft mounted for movement in the lock release passage between a first position in which the lock means is retained in the locking position projecting into the recess and a second position in which the lock means is free to be withdrawn to the release position and a pressure sensitive diaphragm mounted in the housing and connected to the lock release shaft to move the shaft between its first and second positions in response to pressure variations as required.

PREFERRED EMBODIMENT

The invention will be more clearly understood after reference to the following detailed specification read in conjunction with the drawings, wherein.

Figure 1:
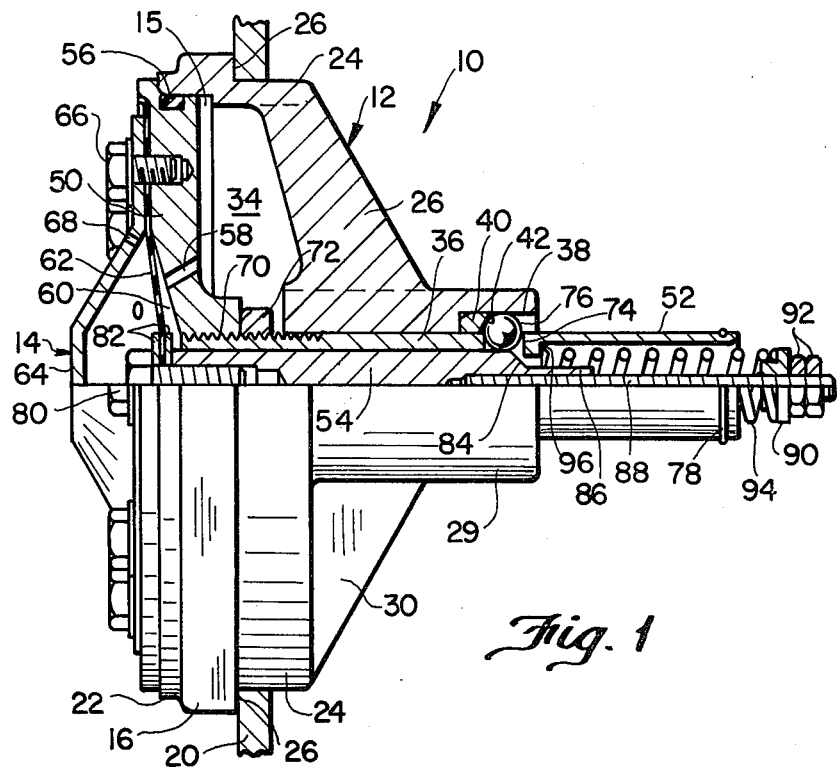
FIG. 1 is a partially sectioned side view of a pressure relief valve according to an embodiment of the present invention.
Figure 2:
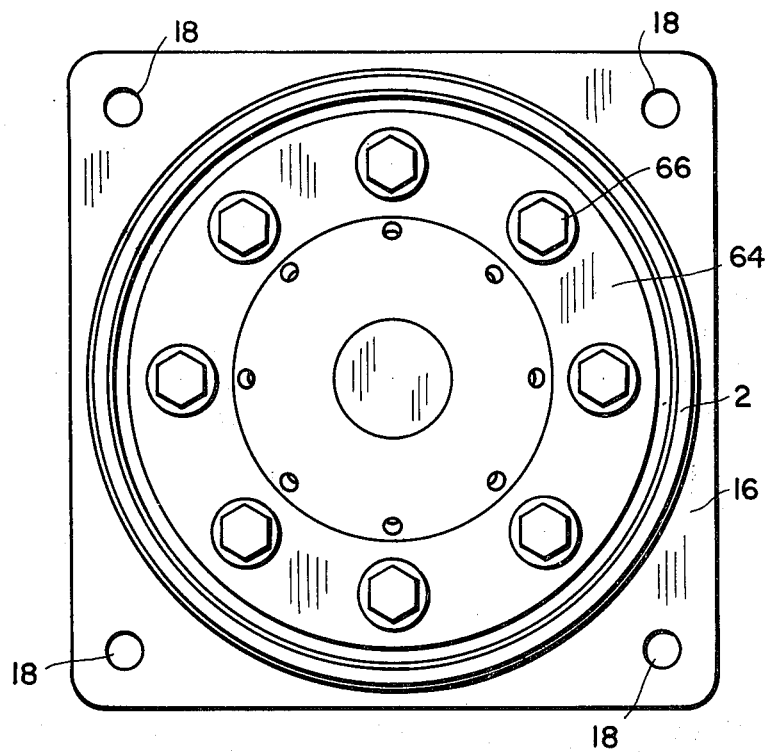
FIG. 2 is a plan view of a pressure relief valve of FIG. 1.
Figure 3:
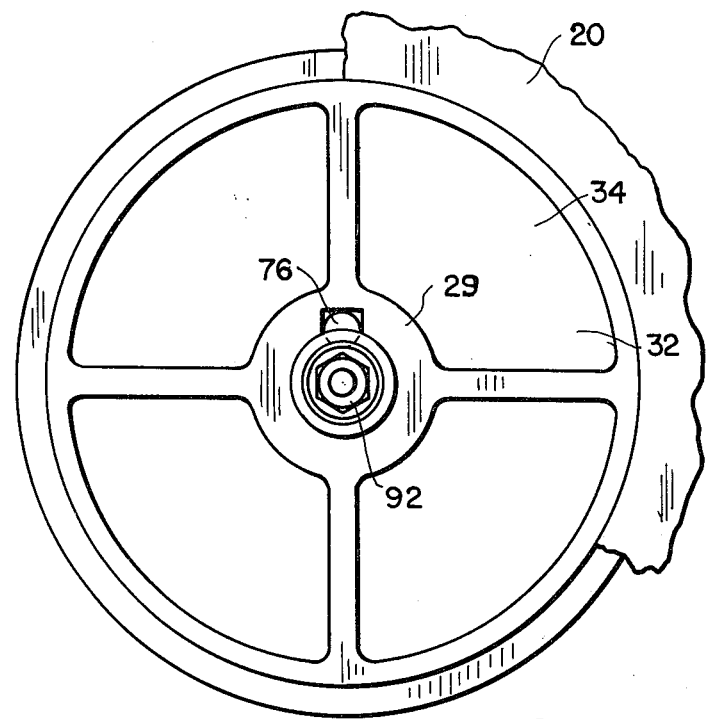
FIG. 3 is a rear view of the pressure relief valve of FIG. 1.

With reference to the drawings, the reference numeral 10 refers generally to a valve according to an embodiment of the present invention. The valve consists of a housing 12 with a valve closure member 14. The housing 12 has a chamber 34 formed therein. The outer end of the valve chamber 34 has a cylindrical portion 15 which is adapted to receive the valve closure member 14 in a sealed relationship. A rectangular shaped face plate 16 projects outwardly from the outer wall of chamber 15 and has four mounting passages 18 extending therethrough for use in mounting the housing 12 with respect to the wall 20 of a vessel or the like. A cylindrical wall 22 extends outwardly from the face plate 16. Housing 12 also includes a cylindrical wall 24 which projects rearwardly from the face plate 16 and forms a ledge 26 on the inner surface of the face plate 16 which engages the wall of the vessel 20. A circular boss 29 is located centrally of the body of the housing and is secured with respect to the cylindrical wall 24 by means of a plurality of radially extending ribs 30. The ribs 30 are uniformly spaced with respect to one another and passages 32 extend between the ribs 30 and the boss 29 and the cylindrical wall 24 to open into the valve chamber 34. The boss 29 has a valve stem passage 36 extending therethrough. A radially extending recess 38 is located at the inner end of the housing and projects radially outwardly from the valve stem passage 36. A pad 40 is located in the recess 38 and has an inclined outer face 42 in the direction of the inner end of the housing.

The valve member 14 consists of a valve head 50, a tubular valve stem 52 and a lock release shaft 54. The valve head 50 is proportioned to fit in a close fitting sliding relationship within the cylindrical portion 15 of the chamber 34 of the valve body and includes an annular sealing ring 56 for sealingly engaging the cylindrical wall of the portion 15. The valve head 50 is formed with at least one passage 58 extending therethrough to provide a communication between the vessel in which the valve is mounted and the diaphragm chamber 60. A diaphragm 62 is secured to the outer face of the head 50 by means of a face plate 64 and a plurality of clamping set screws 66. A plurality of passages 68 open inwardly through the face plate 64 and communicate with the interior of the face plate 64. The passages 68 serve to vent the chamber which is formed inwardly of the face plate 64.

The tubular stem 52 is threadably mounted in the passage 70 which is formed centrally of the valve head 50 and is locked in this position by means of a lock nut 72. The valve stem 52 has a passage 74 extending radially through the wall thereof. A locking member, in the form of four balls 76 which are uniformly spaced around the stem 52, is mounted in the passage 74 for movement in a direction radially of the stem 52 as will be described hereinafter. The balls 76 are proportioned to extend into the recess 38 to lock the stem 52 with respect to the housing 12. A circlip 78 is located at the inner end of the sleeve 52 and serves to limit the movement of the valve member outwardly of the housing by engaging the end of pad 40 when the valve moves to the fully open position.

The lock release shaft 54 is secured with respect to the diaphragm 62 by means of a screw 80 and washers 82. A shoulder 84 is located towards the inner end of the locking shaft 54 and extends inwardly to the portion 86 of the shaft 54 which is of reduced diameter. A shaft 88 is threadably mounted in the inner end of the lock release shaft 54 and forms an extension of the lock release shaft 54 which projects inwardly therefrom. A collar 90 is located at the inner end of the extension shaft 88 and secured against removal from the shaft 88 by means of a pair of lock nuts 92 which are threadably mounted on the end of the shaft 88. A compression spring 94 extends from the collar 90 to the shoulder 96 formed by the inner surface of the valve stem 52.

When the valve is in use, it is as previously indicated mounted in a passage formed in the wall of the vessel 20 with the inner end thereof disposed inwardly of the vessel and the outer end thereof opening outwardly from the vessel. When the valve is in the closed position shown in FIG. 1 of the drawings, the valve head 14 is locked in the closed position by reason of the fact that the locking balls 76 is held in the position extending between the locking passage 74 of the stem and the recess 38 of the housing. The locking balls cannot move radially inwardly with recess 38 because the lock release shaft 54 blocks the inner end of the passage 74. If the pressure in the vessel rises to a predetermined minimum pressure, the increase in pressure is transmitted to the diaphragm chamber 60 by way of passage 58. The increasing pressure causes the diaphragm chamber 60 to expand causing the diaphragm to move to the left in the view illustrated in FIG. 1 of the drawings. Movement of the diaphragm causes movement of the lock release shaft 54 to the left. The compression spring 94 resists the movement of the stem 54 and the resistance of the spring 94 is pre-set such that the release shaft 54 will be located in the position in which the angularly inclined shoulder 84 is located forwardly of the locking balls 76 when the predetermined relief pressure is encountered in the vessel. The pressure in the vessel is acting on the inner face of the valve head at all times and this pressure normally tends to urge the valve stem 36 outwardly with respect to the boss 29. This coacting relationship serves to urge the locking balls 76 radially inwardly when the lock release shaft moves to a position to permit the locking balls 76 to move radially inwardly. When the locking balls 76 moves radially inwardly out of the recess 38, the valve stem 52 is immediately released with respect to the housing 12 and the valve head is thereafter free to move to the fully open position under the influence of the pressure within the vessel which is applied to the large area of the inner surface of the valve head.

Figure 4:
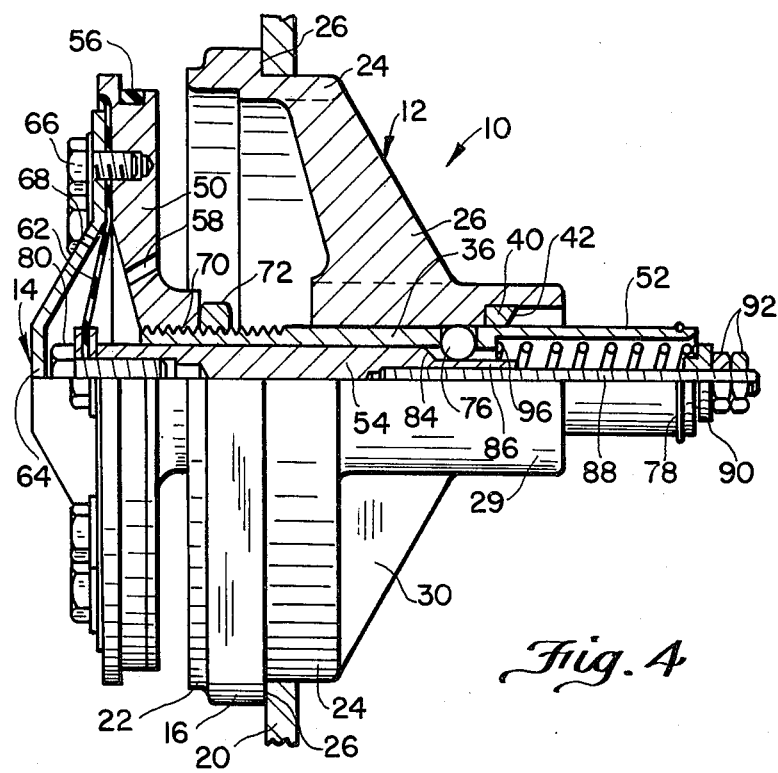
FIG. 4 is a partially sectioned side view similar to FIG. 1 showing the valve in the fully open position.

It will be seen that by adjustment of the spring 94 it is possible to accurately set the pressure at which the locking balls 76 may be withdrawn from the recess 38. Once the balls 76 has been withdrawn from the recess 38, the stem 52 is free to move with respect to the housing without requiring the application of any additional pressure to the valve head member. The pressure required to locate the locking ball members 76 in the withdrawn position is the same or substantially the same as the pressure required to effect a complete opening of the valve to the position shown in FIG. 4 of the drawings.

After the pressure relief valve has blown to relieve the pressure in the vessel, it may be reset after the pressure has been released by simply manually relocating the valve head within the valve body in the position shown in FIG. 1.

From the foregoing it will be apparent that the valve of the present invention is of a simple and rugged construction and provides for the rapid transition from a fully closed position to a fully open position. A pressure relief valve of the type of the present invention is particularly suitable for use in vessels such as gasoline storage tanks and tank trucks by reason of the fact that it can be adjusted to relieve the pressure in response to relatively low pressure increases in the vessel. In applications such as gasoline storage tanks and gasoline tank trucks it is important to release the pressure in the vessel as soon as the pressure rises above a predetermined relatively low maximum pressure and the valve of the present invention is particularly well suited for this type of installation.

The fact that the valve of the present invention does not include any automatic reset mechanism is of importance in installations where a visual indication of the fact that the pressure within the vessel has been released is required. Pressure relief mechanisms with automatic reset mechanisms are well known. However, they have the disadvantage that it is possible for the pressure in the vessel to be released and for the valve to reset without there being any evidence to indicate that such release has taken place. The operation of a relief valve is usually an indication of improper operation of the overall system and it is desirable to have some clear indication that such a failure has taken place. The valve of the present invention will give a clear visual indication that a failure has taken place by reason of the fact that it will not automatically reset to the closed position when the pressure in the vessel returns to an acceptable level.

What I claim as my invention is:

1. A pressure relief valve comprising: a housing having an inner end and an outer end, said housing being mountable in a wall of a pressure vessel with the inner end exposed to the interior of the vessel and the outer end exposed to the exterior of the vessel, a pressure relief passage opening through said housing between said inner end and said outer end through which the interior of a vessel may be vented, a valve seat in said pressure relief passage, a valve member slidably mounted in said housing, said valve member including a valve head adpated to engage said valve seat when in a first position to close said through passage, said valve member being mounted for movement between said first position and a second position in which the pressure relief passage is open to permit full flow therethrough, lock means for releasably interlocking said valve member and said housing to retain said valve member in said first position, pressure responsive lock release means mounted on said valve member and movable in response to an increase in pressure, at said inner end of said housing, above a predetermined minimum pressure, to release said lock means to free said valve member with respect to said housing and thereby permit said valve member to move freely to said second position without any further significant increase in pressure at said inner end of said valve, said housing having a stem passage opening therethrough, said stem passage having a radially outwardly extending recess formed therein, said valve member including a valve stem slidably mounted in said stem passage, a lock release passage extending longitudinally of said stem, a locking passage extending radially through said valve stem, said lock means being mounted for movement in said locking passage between a locking position projecting from said stem into said recess of said housing to interlock said valve member with respect to said housing when said valve member is in said first position and a release position in which it is inwardly withdrawn from said recess to release said valve with respect to said housing, said lock release passage communicating with said locking passage means, said pressure responsive lock release means including; a lock release shaft mounted for movement in said lock release passage between a first position in which said lock means is retained in said locking position projecting into said recess and a second position in which said lock release shaft is spaced from said recess such that said lock means is free to withdraw to said release position, and a pressure sensitive diaphragm mounted on said valve member and connected to said lock release shaft to move said shaft between the first and second positions in response to pressure variations as required, and return spring means extending between said lock release shaft and said valve stem normally urging said lock release shaft to said first position with respect to said valve stem.

2. A pressure relief valve as claimed in claim 1 wherein said valve head has an outer surface directed outwardly from said valve chamber, said pressure sensitive diaphragm being mounted on said outer surface and having a central portion thereof spaced outwardly from said outer surface to define a diaphragm expansion chamber therebetween, vent passage means opening through said valve head into said diaphragm passage for admitting pressurized fluid from said valve chamber to said diaphragm expansion chamber.

* * * * *